United States Patent
Park et al.

(10) Patent No.: US 9,099,240 B2
(45) Date of Patent: *Aug. 4, 2015

(54) MULTILAYERED CERAMIC CAPACITOR AND BOARD FOR MOUNTING THE SAME

(71) Applicant: SAMSUNG ELECTRO-MECHANICS CO., LTD., Suwon, Gyunggi-do (KR)

(72) Inventors: Min Cheol Park, Gyunggi-do (KR); Sang Soo Park, Gyunggi-do (KR); Young Ghyu Ahn, Gyunggi-do (KR); Byoung Hwa Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 237 days.

This patent is subject to a terminal disclaimer.

(21) Appl. No.: 13/764,106

(22) Filed: Feb. 11, 2013

(65) Prior Publication Data

US 2014/0153156 A1    Jun. 5, 2014

(30) Foreign Application Priority Data

Dec. 4, 2012   (KR) .................. 10-2012-0139624

(51) Int. Cl.
*H01G 4/30* (2006.01)
*H01G 4/06* (2006.01)
(Continued)

(52) U.S. Cl.
CPC .............. *H01G 4/002* (2013.01); *H01G 4/012* (2013.01); *H01G 4/12* (2013.01); *H01G 4/30* (2013.01)

(58) Field of Classification Search
CPC ............ H01G 4/30; H01G 4/06; H01G 4/015

USPC ...................... 361/301.4, 311, 303
See application file for complete search history.

(56) References Cited

U.S. PATENT DOCUMENTS 8,638,543 B2 * 1/2014 Ahn et al. .................. 361/311
2006/0158827 A1 7/2006 Lee et al.
(Continued)

FOREIGN PATENT DOCUMENTS

JP     06-215978 A    8/1994
JP     07-045469 A    2/1995
(Continued)

OTHER PUBLICATIONS

Office Action issued in Japanese Patent Application No. 2013-020212 dated Nov. 26, 2013 with English translation.
(Continued)

*Primary Examiner* — Eric Thomas
(74) *Attorney, Agent, or Firm* — McDermott Will & Emery LLP (57) ABSTRACT

A multilayered ceramic capacitor includes a ceramic body in which a plurality of dielectric layers having an average thickness of 0.2 to 2.0 μm are stacked; an active layer including a plurality of first and second internal electrodes alternately exposed to both end surfaces of the ceramic body, having the dielectric layer interposed therebetween, to form capacitance; an upper cover layer formed above the active layer; a lower cover layer formed below the active layer and thicker than the upper cover layer; and first and second external electrodes covering both end surfaces of the ceramic body, wherein the dielectric layer is configured of dielectric grains, and when an average thickness of the dielectric layer is defined as td, an average thickness of the first and second internal electrodes is defined as te, and an average grain size of the dielectric grains is defined as Da, Da≤td/3 and 0.2 μm<te<(td)$^{1/2}$ are satisfied.

12 Claims, 4 Drawing Sheets

(51) Int. Cl.
*H01G 4/002* (2006.01)
*H01G 4/012* (2006.01)
*H01G 4/12* (2006.01)

(56) References Cited

U.S. PATENT DOCUMENTS

2007/0211409 A1* 9/2007 Hara et al. .................... 361/311
2012/0147518 A1  6/2012 Matsuda et al.

FOREIGN PATENT DOCUMENTS

| JP | 2005-079426 A | 3/2005 |
|---|---|---|
| JP | 2006-203165 A | 8/2006 |
| WO | 2011024582 A1 | 3/2011 |

OTHER PUBLICATIONS

Korean Office Action issued in Korean Patent Application No. 10-2012-0139624 dated Jan. 20, 2014, with English translation, 6 pgs.

Taiwanese Office Action dated Dec. 1, 2014 issued in Taiwanese Patent Application No. 102103082 (English translation).

* cited by examiner

MULTILAYERED CERAMIC CAPACITOR AND BOARD FOR MOUNTING THE SAME

CROSS-REFERENCE TO RELATED APPLICATIONS

This application claims the priority of Korean Patent Application No. 10-2012-0139624 filed on Dec. 4, 2012, in the Korean Intellectual Property Office, the disclosure of which is incorporated herein by reference.

BACKGROUND OF THE INVENTION

1. Field of the Invention

The present invention relates to a multilayered ceramic capacitor and a board for mounting the same.

2. Description of the Related Art

In general, multilayered ceramic capacitors, multilayered chip electronic components, are chip shaped condensers mounted on printed circuit boards of various electronic products such as display devices, for example, liquid crystal displays (LCDs), plasma display panels (PDPs), and the like, computers, smart phones, mobile phones, and the like, serving to charge or discharge electricity.

Since this multilayered ceramic capacitor (MLCC) has advantages such as a small size, high capacitance, ease of mounting, or the like, the multilayered ceramic capacitor may be used as a component of various electronic devices.

The multilayered ceramic capacitor may have a structure in which a plurality of dielectric layers and internal electrodes having opposite polarities while having the dielectric layer interposed therebetween are alternately stacked.

Since the dielectric layers have piezoelectric and electrostrictive properties, when direct current (DC) or alternating current (AC) voltage is applied to the multilayered ceramic capacitor, a piezoelectric phenomenon is generated between the internal electrodes, thereby causing vibrations.

These vibrations maybe transferred to a printed circuit board on which the multilayered ceramic capacitor is mounted through a solder of the multilayered ceramic capacitor, such that the entire printed circuit board may become an acoustic reflective surface generating a vibration sound, known as noise.

The vibration sound may have a frequency corresponding to an audio frequency in a region of 20 to 20000 Hz, making a listener uncomfortable. The vibratory sound making the person uncomfortable as described above is known as acoustic noise.

In order to reduce acoustic noise, research into a product having a form in which a thickness of a lower cover layer of the multilayered ceramic capacitor is increased has been undertaken.

In addition, when the multilayered ceramic capacitor having the increased thickness of the lower cover layer is mounted on the printed circuit board, the thick lower cover layer may be positioned in a lowermost position so as to be advantageous in decreasing acoustic noise, such that the multilayered ceramic capacitor may be mounted in a horizontal mounting scheme.

Meanwhile, in the case of a product having a form in which the thickness of the lower cover layer of the multilayered ceramic capacitor is increased in order to reduce acoustic noise, the amount of stacked layers is increased or the dielectric layers are thinned in order to implement high capacitance, such that a crack defect or a delamination defect may be generated in a sintering process and a breakdown voltage (BDV) may be lowered.

RELATED ART DOCUMENT (Patent Document 1) Japanese Patent Laid-Open Publication No. 2006-203165

SUMMARY OF THE INVENTION

An aspect of the present invention provides a multilayered ceramic capacitor and a board for mounting the same.

According to an aspect of the present invention, there is provided a multilayered ceramic capacitor including: a ceramic body in which a plurality of dielectric layers having an average thickness of 0.2 to 2.0 µm are stacked; an active layer including a plurality of first and second internal electrodes formed to be alternately exposed to both end surfaces of the ceramic body, having the dielectric layer interposed therebetween, to form capacitance; an upper cover layer formed above the active layer; a lower cover layer formed below the active layer and being thicker than the upper cover layer; and first and second external electrodes formed to cover both end surfaces of the ceramic body, wherein the dielectric layer is configured of dielectric grains, and when an average thickness of the dielectric layer is defined as td (µm), an average thickness of the first and second internal electrodes is defined as to (µm), and an average grain size of the dielectric grains is defined as Da (µm), Da≤td/3 and $0.2\ \mu m < te < (td)^{1/2}$ are satisfied.

When half of a total thickness of the ceramic body is defined as A, a thickness of the lower cover layer is defined as B, half of a total thickness of the active layer is defined as C, and a thickness of the upper cover layer is defined as D, a ratio ((B+C)/A) of deviation between a center of the active layer and a center of the ceramic body may be in a range of 1.063 to 1.745 (1.063≤(B+C)/A≤1.745).

When a thickness of the lower cover layer is defined as B and a thickness of the upper cover layer is defined as D, a ratio (D/B) of the thickness D of the upper cover layer to the thickness B of the lower cover layer may be in a range of 0.021 to 0.422 (0.021≤D/B≤0.422).

When half of a total thickness of the ceramic body is defined as A and a thickness of the lower cover layer is defined as B, a ratio (B/A) of the thickness B of the lower cover layer to the half A of the thickness of the ceramic body may be in a range of 0.329 to 1.522 (0.329≤B/A≤1.522).

When a thickness of the lower cover layer is defined as B and half of a total thickness of the active layer is defined as C, a ratio (C/B) of the half C of the thickness of the active layer to the thickness B of the lower cover layer may be in a range of 0.146 to 2.458 (0.146≤C/B≤2.458).

Points of inflection (PI) formed in both end surfaces of the ceramic body are formed in positions lower than a center of the ceramic body in a thickness direction due to a difference between strain generated in a center of the active layer and strain generated in the lower cover layer when voltage is applied thereto.

The number of stacked dielectric layers may be 150 or more.

According to another aspect of the present invention, there is provided a board for mounting a multilayered ceramic capacitor, the board including: a printed circuit board having first and second electrode pads formed thereon; and a multilayered ceramic capacitor mounted on the printed circuit board, wherein the multilayered ceramic capacitor includes a ceramic body in which a plurality of dielectric layers having an average thickness of 0.2 to 2.0 μm are stacked; an active layer including a plurality of first and second internal electrodes formed to be alternately exposed to both end surfaces of the ceramic body, having the dielectric layer interposed therebetween, to form capacitance; an upper cover layer formed above the active layer; a lower cover layer formed below the active layer and being thicker than the upper cover layer; and first and second external electrodes formed on the both end surfaces of the ceramic body and connected to the first and second electrode pads by soldering, the dielectric layer being configured of dielectric grains, and when an average thickness of the dielectric layer is defined as td (μm), an average thickness of the first and second internal electrodes is defined as te (μm), and an average grain size of the dielectric grains is defined as Da (μm), Da≤td/3 and 0.2 μm<te<(td)$^{1/2}$ are satisfied.

When half of a total thickness of the ceramic body is defined as A, a thickness of the lower cover layer is defined as B, half of a total thickness of the active layer is defined as C, and a thickness of the upper cover layer is defined as D, a ratio ((B+C)/A) of deviation between a center of the active layer and a center of the ceramic body may be in a range of 1.063 to 1.745 (1.063≤(B+C)/A≤1.745).

When a thickness of the lower cover layer is defined as B and a thickness of the upper cover layer is defined as D, a ratio (D/B) of the thickness D of the upper cover layer to the thickness B of the lower cover layer may be in a range of 0.021 to 0.422 (0.021≤D/B≤0.422).

When half of a total thickness of the ceramic body is defined as A and a thickness of the lower cover layer is defined as B, a ratio (B/A) of the thickness B of the lower cover layer to the half A of the thickness of the ceramic body may be in a range of 0.329 to 1.522 (0.329≤B/A≤1.522).

When a thickness of the lower cover layer is defined as B and half of a total thickness of the active layer is defined as C, a ratio (C/B) of the half C of the thickness of the active layer to the thickness B of the lower cover layer may be in a range of 0.146 to 2.458 (0.146≤C/B≤2.458).

Points of inflection (PI) formed in both end surfaces of the ceramic body may be formed in positions lower than a height of the soldering due to a difference between strain generated in a center of the active layer and strain generated in the lower cover layer when voltage is applied thereto.

The number of stacked dielectric layers is 150 or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the concept of the invention to those skilled in the art.

In the drawings, the shapes and dimensions of components maybe exaggerated for clarity, and the same reference numerals will be used throughout to designate the same or like components.

Directions of a hexahedron will be defined in order to clearly describe the embodiments of the present invention. L, W and T shown in the accompanying drawings refer to a length direction, a width direction, and a thickness direction, respectively. Here, the thickness direction may be used to have the same concept as that of a direction in which dielectric layers are stacked.

Further, in the present embodiment, for convenience of explanation, a description will be provided in a state in which surfaces of a ceramic body on which first and second external electrodes are formed in the length direction are set to both end surfaces and surfaces of the ceramic body vertically intersecting with the both end surfaces are set to side surfaces.

In addition, an upper surface of the ceramic body on which an upper cover layer thereof is formed is represented by $S_T$, and a lower surface of the ceramic body on which a lower cover layer thereof is formed is represented by $S_B$.

Hereinafter, embodiments of the present invention will now be described in detail with reference to the accompanying drawings.

Figure 1:
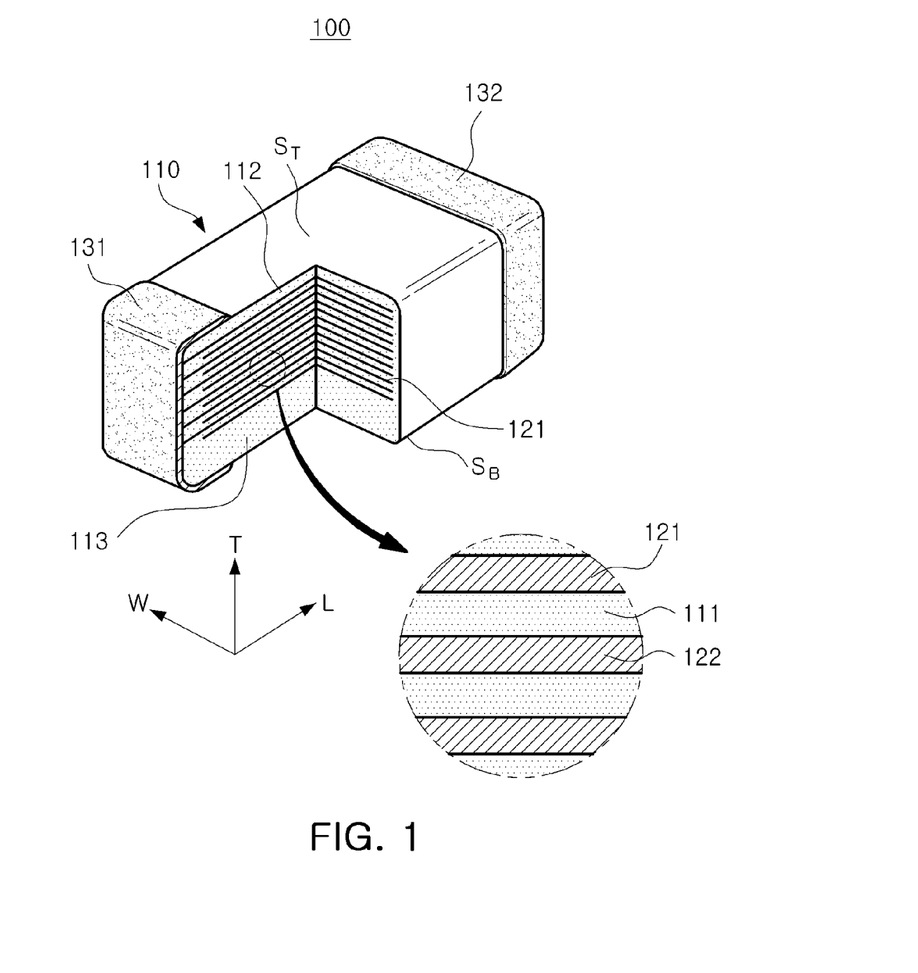
FIG. 1 is a partially cut-away perspective view schematically showing a multilayered ceramic capacitor according to an embodiment of the present invention.

FIG. 1 is a partially cut-away perspective view schematically showing a multilayered ceramic capacitor according to an embodiment of the present invention.

Figure 2:
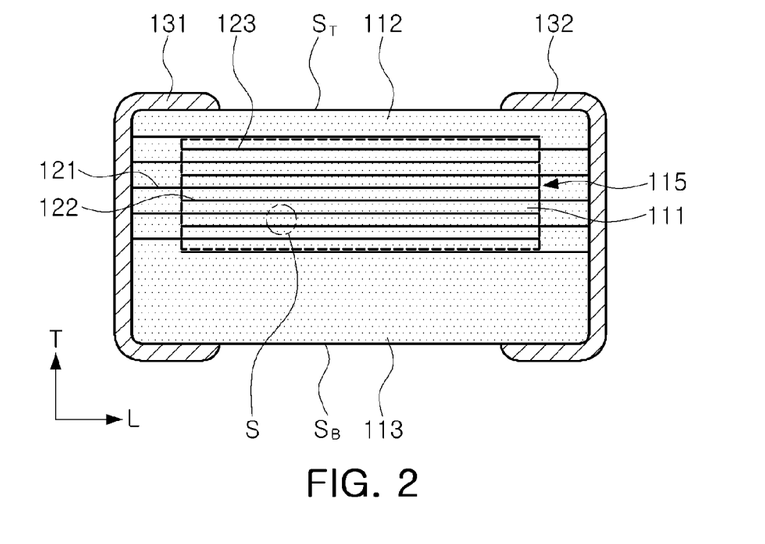
FIG. 2 is a cross-sectional view of the multilayered ceramic capacitor of FIG. 1 taken in a length direction.

FIG. 2 is a cross-sectional view of the multilayered ceramic capacitor of FIG. 1 taken in a length direction.

Figure 3:
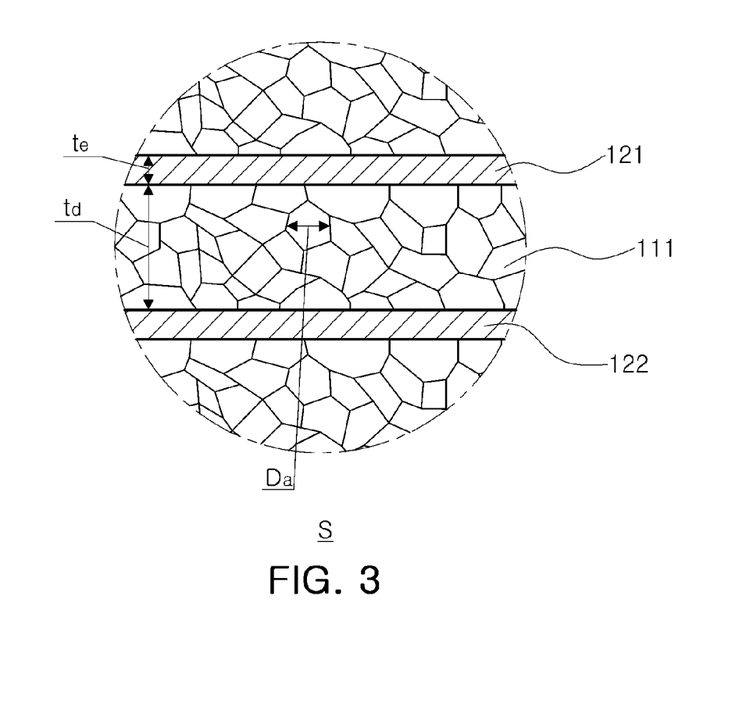
FIG. 3 is an enlarged view of region S of FIG. 2.

FIG. 3 is an enlarged view of region S of FIG. 2.

Figure 4:
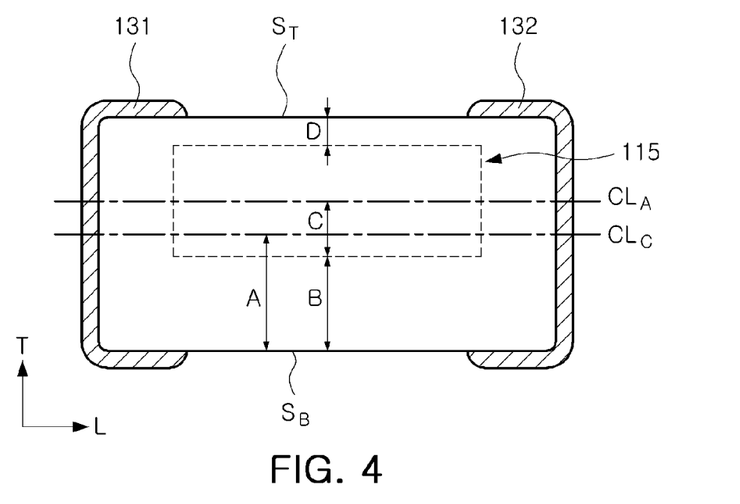
FIG. 4 is a schematic cross-sectional view of the multilayered ceramic capacitor of FIG. 1 taken in the length direction in order to describe a dimensional relationship between components included in the multilayered ceramic capacitor.

FIG. 4 is a schematic cross-sectional view of the multilayered ceramic capacitor of FIG. 1 taken in the length direction in order to describe a dimensional relationship between components included in the multilayered ceramic capacitor.

Referring to FIGS. 1 through 4, a multilayered ceramic capacitor 100 according to the embodiment of the present invention may include a ceramic body 110, an active layer 115 having first and second internal electrodes 121 and 122, upper and lower cover layers 112 and 113, and first and second external electrodes 131 and 132 covering both end surfaces of the ceramic body 110.

The ceramic body 110 may be formed by stacking a plurality of dielectric layers 111 and sintering the same. In this case, a shape and a dimension of the ceramic body 110 and the number of stacked dielectric layers 111 are not limited to those of the embodiment shown in the accompanying drawings.

In addition, the plurality of dielectric layers 111 configuring the ceramic body 110 may be in a sintered state. Adjacent dielectric layers 111 may be integrated such that a boundary therebetween may not be clearly discernible without using a scanning electron microscope (SEM).

The ceramic body 110 may include the active layer 115 as a part contributing to forming capacitance of the capacitor and the upper and lower cover layers 112 and 113 formed as upper and lower margin parts on and beneath the active layer 115.

The active layer 115 may be formed by repeatedly stacking the first and second internal electrodes 131 and 132, having the dielectric layer 111 therebetween.

According to the embodiment of the present invention, an average thickness of the dielectric layer 111 may be optionally changed according to capacitance design of the multilayered ceramic capacitor 100, but an average thickness of a single dielectric layer may be 0.2 to 2.0 μm after sintering.

The average thickness of the dielectric layer 111 may be measured from an image obtained by scanning a cross section of the ceramic body 110 in the length direction using a scanning electron microscope (SEM) as shown in FIG. 2.

For example, the average thickness of the dielectric layer may be obtained by measuring thicknesses thereof at thirty equidistant points in the length direction, with respect to any dielectric layer extracted from the image obtained by scanning the cross section of the ceramic body 110 in the length-thickness (L-T) direction taken along a center of the ceramic body 110 in the width (W) direction using the scanning electron microscope (SEM), and then averaging the measured thicknesses, as shown in FIG. 2.

The thicknesses at the thirty equidistant points may be measured in a capacitance forming part in which the first and second internal electrodes 121 and 122 overlap each other.

In addition, when an average thickness of ten or more dielectric layers is measured by the above-mentioned method, the average thickness of the dielectric layer may be further generalized.

The average thickness of the dielectric layer 111 satisfies a range of 0.2 to 2.0 μm, such that a multilayered ceramic capacitor having excellent reliability may be implemented.

In the case in which the average thickness of the dielectric layer is less than 0.2 μm, a distance between the internal electrodes becomes close, such that short circuits may be generated. In the case in which the average thickness is more than 2.0 μm, a high capacitance multilayered ceramic capacitor may not be implemented.

Further, the dielectric layer 111 may contain a ceramic powder having high permittivity, for example, a barium titanate ($BaTiO_3$) based powder or a strontium titanate ($SrTiO_3$) based powder, or the like, but the present invention is not limited thereto.

The upper and lower cover layers 112 and 113 may have the same material and configuration as those of the dielectric layer 111, except that the internal electrodes are not included therein.

The upper and lower cover layers 112 and 113 may be formed by stacking a single or two or more dielectric layers on upper and lower surfaces of the active layer 115 in a vertical direction, respectively. The upper and lower cover layers 112 and 113 may serve to prevent the first and second internal electrodes 121 and 122 from being damaged by physical or chemical stress.

In addition, the lower cover layer 113 may be thicker than the upper cover layer by further increasing the number of stacked dielectric layers as compared with the upper cover layer 112.

Meanwhile, the first and second internal electrodes 121 and 122, a pair of electrodes having different polarities from each other, may be formed by printing a conductive paste including a conductive metal on the dielectric layers 111 while allowing them to have a predetermined thickness.

In addition, the first and second internal electrodes 121 and 122 may be alternately exposed to both end surfaces of the ceramic body in the direction in which the dielectric layers 111 are stacked, and may be electrically insulated from each other by the dielectric layer 111 interposed therebetween.

That is, the first and second internal electrodes 121 and 122 may be electrically connected to the first and second external electrodes 131 and 132 through portions thereof alternately exposed to the both end surfaces of the ceramic body 110, respectively.

Therefore, when voltage is applied to the first and second external electrodes 131 and 132, electric charges are accumulated between the first and second internal electrodes 121 and 122 facing each other. In this case, the capacitance of the multilayered ceramic capacitor 100 may be in proportion to an area of a region overlapped between the first and second internal electrodes 121 and 122.

Further, the conductive metal included in the conductive paste forming the first and second internal electrodes 121 and 122 may be nickel (Ni), copper (Cu), palladium (Pd), or an alloy thereof, but the present invention is not limited thereto.

In addition, as a method of printing the conductive paste, a screen printing method, a gravure printing method, or the like, maybe used, but the present invention is not limited thereto.

Meanwhile, the first and second external electrodes 131 and 132 may be formed of a conductive paste including a conductive metal, and the conductive metal may be nickel (Ni), copper (Cu), palladium (Pd), gold (Au), or an alloy thereof, but the present invention is not limited thereto.

According to the embodiment of the present invention, the dielectric layer 111 maybe configured of dielectric grains. When the average thickness of the dielectric layer 111 is defined as td, an average thickness of the first and second internal electrodes 121 and 122 is defined as te, and an average grain diameter of the dielectric grains is defined as Da, $Da \leq td/3$ and $0.2 \mu m < te < (td)^{1/2}$ may be satisfied.

Generally, in the case of a product having a form in which the thickness of the lower cover layer of the multilayered ceramic capacitor is increased in order to reduce the acoustic noise, the number of stacked layers is increased or the dielectric layers are thinned in order to implement high capacitance, such that a crack defect or a delamination defect maybe generated in a sintering process and a breakdown voltage (BDV) may be lowered.

However, according to the embodiment of the present invention, the dielectric layer 111 may be configured of the dielectric grains. When the average thickness of the dielectric layer 111 is defined as td (μm), the average thickness of the first and second internal electrodes 121 and 122 is defined as to (μm), and the average grain diameter of the dielectric grains is defined as Da (μm), the dimensions of the components of the multilayered ceramic capacitor are adjusted to satisfy $Da \leq td/3$ and $0.2 \mu m < te < (td)^{1/2}$, such that the high capacitance multilayered ceramic capacitor having excellent reliability may be implemented.

When the average thickness of the dielectric layer 111 is defined as td (μm), and the average grain diameter of the dielectric grains is defined as Da (μm), Da≤td/3 may be satisfied.

As described above, the breakdown voltage characteristics of the multilayered ceramic capacitor may be improved by satisfying Da≤td/3, whereby excellent reliability may be achieved.

In the case in which the average grain diameter Da of the dielectric grains is more than ⅓ of the average thickness td of the dielectric layer 111, the breakdown voltage (BDV) may be reduced.

Meanwhile, when the average thickness of the dielectric layer 111 is defined as td (μm), and the average thickness of the first and second internal electrodes 121 and 122 is defined as te (μm), $0.2 \mu m < te < (td)^{1/2}$ may be satisfied.

The average thickness of the first and second internal electrodes 121 and 122 may be measured from the image obtained by scanning the cross section of the ceramic body 110 in the length direction using a scanning electron microscope (SEM) as shown in FIG. 2.

For example, the average thickness of the first and second internal electrodes 121 and 122 may be obtained by measuring thicknesses thereof at 30 equidistant points in the length direction, with respect to any internal electrode extracted from the image obtained by scanning the cross section of the ceramic body 110 in the length-thickness (L-T) direction taken along the center of the ceramic body 110 in the width (W) direction using the scanning electron microscope (SEM), and then averaging the measured thicknesses, as shown in FIG. 2.

The thicknesses at the thirty equidistant points may be measured in the capacitance forming part in which the first and second internal electrodes 121 and 122 overlap each other.

In addition, when an average thickness of ten or more internal electrodes is measured by the above-mentioned method, the average thickness of the first and second internal electrodes 121 and 122 may be further generalized.

When the average thickness of the dielectric layer 111 is defined as td (μm) and the average thickness of the first and second internal electrodes is defined as te (μm), the dimensions of the components of the multilayered ceramic capacitor are adjusted to satisfy $0.2 \mu m < te < (td)^{1/2}$, such that the high capacitance multilayered ceramic capacitor having excellent reliability may be implemented.

In the case in which the average thickness te of the first and second internal electrodes 121 and 122 is less than 0.2 μm, the high capacitance multilayered ceramic capacitor may not be implemented.

In the case in which the average thickness te of the first and second internal electrodes 121 and 122 is more than $(td)^{1/2}$, a crack defect or a delamination defect maybe generated, thereby reducing reliability.

Hereinafter, a relationship between dimensions of components included in the multilayered ceramic capacitor according to the embodiment of the present invention and the acoustic noise will be described.

Referring to FIG. 4, when half of a total thickness of the ceramic body 110 is defined as A, a thickness of the lower cover layer 113 is defined as B, half of a total thickness of the active layer 115 is defined as C, and a thickness of the upper cover layer 112 is defined as D.

Here, the total thickness of the ceramic body 110 refers to a distance from the upper surface $S_T$ of the ceramic body 110 to the lower surface $S_B$ thereof, and the total thickness of the active layer 115 refers to a distance from an upper surface of a first internal electrode 121 formed on the uppermost portion of the active layer 115 to a lower surface of a second internal electrode 122 formed on the lowermost portion of the active layer 115.

In addition, the thickness B of the lower cover layer 113 refers to a distance from the lower surface of the second internal electrode 122 formed on the lowermost portion of the active layer 115 in the thickness direction to the lower surface $S_B$ of the ceramic body 110, and the thickness D of the upper cover layer 112 refers to a distance from the upper surface of the first internal electrode 121 formed on the uppermost portion of the active layer 115 in the thickness direction to the upper surface $S_T$ of the ceramic body 110.

When voltages having different polarities are applied to the first and second external electrodes 131 and 132 formed on both end portions of the multilayered ceramic capacitor 100, the ceramic body 110 may be expanded and contracted in the thickness direction by an inverse piezoelectric effect of the dielectric layer 111, and both end portions of the first and second external electrodes 131 and 132 may be expanded and contracted as opposed to the expansion and contraction of the ceramic body 110 in the thickness direction by a poisson effect.

Here, a center of the active layer 115, is maximally expanded and contracted from both end portions of the first and second external electrodes 131 and 132 in the length direction, may be a cause of the acoustic noise generation.

That is, according to the embodiment of the present invention, in order to reduce the acoustic noise, points of inflection (PI) formed in both end surfaces of the ceramic body 110 may be formed in positions lower than a center $CL_c$ of the ceramic body 110 in the thickness direction, due to a difference between strain generated in a center $CL_A$ of the active layer 115 and strain generated in the lower cover layer 113 at the time of applying voltage.

In this case, in order to further reduce the acoustic noise, a ratio of deviation between the center $CL_A$ of the active layer 115 and the center CL of the ceramic body 110, that is, (B+C)/A may be in a range of 1.063 to 1.745 (1.063≤(B+C)/A≤1.745).

Further, a ratio of the thickness D of the upper cover layer 112 to the thickness B of the lower cover layer 113, that is, D/B may be in a range of 0.021 to 0.422 (0.021≤D/B≤0.422).

In addition, a ratio of the thickness B of the lower cover layer 113 to the half A of the thickness of the ceramic body, that is, B/A may be in a range of 0.329 to 1.522 (0.329≤B/A≤1.522).

Further, a ratio of the half C of the thickness of the active layer 115 to the thickness B of the lower cover layer, that is, C/B may be in a range of 0.146 to 2.458 (0.146≤C/B≤2.458).

EXPERIMENTAL EXAMPLE

Multilayered ceramic capacitors according to Inventive Examples and Comparative Examples were manufactured as follows.

Slurry containing a powder such as barium titanate (BaTiO$_3$), or the like, was applied and dried onto a carrier film to prepare a plurality of ceramic green sheets having a thickness of 1.8 μm.

Next, a conductive paste for nickel internal electrodes was applied to the ceramic green sheets using a screen to form internal electrodes.

About 370 ceramic green sheets were stacked. In this case, the ceramic green sheets on which the internal electrodes were not formed were more densely stacked below the ceramic green sheets on which the internal electrodes were formed as compared with above the ceramic green sheets on which the internal electrodes were formed. Isostatic pressing was performed on this stacked body at 85° C. and a pressure of 1000 kgf/cm².

The pressed ceramic stacked body was cut into individual chips and the cut chips were de-bound at 230° C. for 60 hours under an air atmosphere.

Then, they were sintered at 1200° C. under reducing atmosphere having oxygen partial pressure of $10^{-11}$ atm to $10^{-10}$ atm lower than oxygen partial pressure in a state in which Ni/NiO are balanced, so that the internal electrodes were not oxidized. A chip size of the multilayered chip capacitor after sintering was about 1.64 mm×0.88 mm (Length×Width (L×W), 1608 size). In this case, a manufacturing tolerance was in a range of ±0.1 mm, and experiments were performed on samples satisfying this range, such that acoustic noise was measured in each sample.

Next, processes such as a process of forming external electrodes, a plating process, and the like, were performed to manufacture the multilayered ceramic capacitor.

defined as B, half of a total thickness of the active layer 115 was defined as C, and a thickness of the upper cover layer 112 was defined as D, as described above.

In order to measure the acoustic noise, after one sample (multilayered chip capacitor) per a board for measuring acoustic noise was mounted on a printed circuit board in a vertical direction, the board was mounted on a measurement jig.

In addition, DC voltage and voltage variation were applied to both terminals of the sample mounted on the measurement jig using a DC power supply and a function generator. The acoustic noise was measured through a mike installed directly above the printed circuit board.

In Table 1, samples 1 to 3 were Comparative Examples of a capacitor having a cover symmetry structure in which the thickness B of the lower cover layer 113 and the thickness D of the upper cover layer 112 were almost the same as each other, and samples 4 to 13 were Comparative Examples of a capacitor having a structure in which the thickness D of the upper cover layer 112 was thicker than the thickness B of the lower cover layer.

TABLE 1

| Sample | A (μm) | B (μm) | C (μm) | D (μm) | (B + C)/A | B/A | D/B | C/B | AN (dB) | Implementation of Capacitance |
|---|---|---|---|---|---|---|---|---|---|---|
| 1* | 405.5 | 40.2 | 365.4 | 39.9 | 1.000 | 0.099 | 0.993 | 9.090 | 29.5 | OK |
| 2* | 436.0 | 70.4 | 365.9 | 69.7 | 1.001 | 0.161 | 0.990 | 5.197 | 25.7 | OK |
| 3* | 455.5 | 90.8 | 364.3 | 91.5 | 0.999 | 0.199 | 1.008 | 4.012 | 23.1 | OK |
| 4* | 508.1 | 24.9 | 361.1 | 269.1 | 0.760 | 0.049 | 10.807 | 14.502 | 31.2 | OK |
| 5* | 456.6 | 25.2 | 360.1 | 167.8 | 0.844 | 0.055 | 6.659 | 14.290 | 32.5 | OK |
| 6* | 527.3 | 30.2 | 191.0 | 642.4 | 0.419 | 0.057 | 21.272 | 6.325 | 30.3 | OK |
| 7* | 414.5 | 30.9 | 188.8 | 420.4 | 0.530 | 0.075 | 13.605 | 6.110 | 30.5 | OK |
| 8* | 516.2 | 39.4 | 360.7 | 271.5 | 0.775 | 0.076 | 6.891 | 9.155 | 28.2 | OK |
| 9* | 446.0 | 39.8 | 365.5 | 121.2 | 0.909 | 0.089 | 3.045 | 9.183 | 29.1 | OK |
| 10* | 469.1 | 40.6 | 364.2 | 169.1 | 0.863 | 0.087 | 4.165 | 8.970 | 27.9 | OK |
| 11* | 416.2 | 40.7 | 360.7 | 70.3 | 0.964 | 0.098 | 1.727 | 8.862 | 28.4 | OK |
| 12* | 428.3 | 40.8 | 360.0 | 95.7 | 0.936 | 0.095 | 2.346 | 8.824 | 28.9 | OK |
| 13* | 495.9 | 40.9 | 364.9 | 221.0 | 0.818 | 0.082 | 5.403 | 8.922 | 28.1 | OK |
| 14* | 435.9 | 25.0 | 421.3 | 4.2 | 1.024 | 0.057 | 0.168 | 16.852 | 31.6 | OK |
| 15* | 420.7 | 70.4 | 365.9 | 39.1 | 1.037 | 0.167 | 0.555 | 5.197 | 25.7 | OK |
| 16 | 431.7 | 94.8 | 364.3 | 40.0 | 1.063 | 0.220 | 0.422 | 3.843 | 19.9 | OK |
| 17 | 443.0 | 103.8 | 389.1 | 4.0 | 1.113 | 0.234 | 0.039 | 3.749 | 19.3 | OK |
| 18 | 443.7 | 119.8 | 363.2 | 41.1 | 1.089 | 0.270 | 0.343 | 3.032 | 18.7 | OK |
| 19 | 447.1 | 147.3 | 362.1 | 22.7 | 1.139 | 0.329 | 0.154 | 2.458 | 17.9 | OK |
| 20 | 452.8 | 164.7 | 360.2 | 20.4 | 1.159 | 0.364 | 0.124 | 2.187 | 17.3 | OK |
| 21 | 448.7 | 170.3 | 361.0 | 5.1 | 1.184 | 0.380 | 0.030 | 2.120 | 17.2 | OK |
| 22 | 470.7 | 170.4 | 365.4 | 40.2 | 1.138 | 0.362 | 0.236 | 2.144 | 17.4 | OK |
| 23 | 491.9 | 220.3 | 360.8 | 41.8 | 1.181 | 0.448 | 0.190 | 1.638 | 16.9 | OK |
| 24 | 500.6 | 270.2 | 360.5 | 9.9 | 1.260 | 0.540 | 0.037 | 1.334 | 16.8 | OK |
| 25 | 516.9 | 270.4 | 361.8 | 39.7 | 1.223 | 0.523 | 0.147 | 1.338 | 16.7 | OK |
| 26 | 502.1 | 364.9 | 312.3 | 14.7 | 1.349 | 0.727 | 0.040 | 0.856 | 16.6 | OK |
| 27 | 407.5 | 421.8 | 189.1 | 14.9 | 1.499 | 1.035 | 0.035 | 0.448 | 16.6 | OK |
| 28 | 445.8 | 493.3 | 179.3 | 39.7 | 1.509 | 1.107 | 0.080 | 0.363 | 16.5 | OK |
| 29 | 483.7 | 632.0 | 160.1 | 15.2 | 1.638 | 1.307 | 0.024 | 0.253 | 16.4 | OK |
| 30 | 520.0 | 643.4 | 190.7 | 15.2 | 1.604 | 1.237 | 0.024 | 0.296 | 16.4 | OK |
| 31 | 486.4 | 685.3 | 121.1 | 45.3 | 1.658 | 1.409 | 0.066 | 0.177 | 16.4 | OK |
| 32 | 507.2 | 742.7 | 120.8 | 30.1 | 1.702 | 1.464 | 0.041 | 0.163 | 16.4 | OK |
| 33 | 515.2 | 773.9 | 118.2 | 20.1 | 1.732 | 1.502 | 0.026 | 0.153 | 16.4 | OK |
| 34 | 524.5 | 798.2 | 116.9 | 16.9 | 1.745 | 1.522 | 0.021 | 0.146 | 16.3 | OK |
| 35* | 533.4 | 832.4 | 109.8 | 14.8 | 1.766 | 1.561 | 0.018 | 0.132 | 16.3 | NG |
| 36* | 533.3 | 841.1 | 105.3 | 14.9 | 1.775 | 1.577 | 0.018 | 0.125 | 16.3 | NG |
| 37* | 534.1 | 849.7 | 101.2 | 16.1 | 1.780 | 1.591 | 0.019 | 0.119 | 16.3 | NG |

*Comparative Example,
AN: acoustic noise

Data of Table 1 were obtained by measuring each dimension from an image obtained by scanning a cross section of the ceramic body 110 of the multilayered ceramic capacitor 100 in a length-thickness (L-T) direction taken along a center of the ceramic body 100 in a width (W) direction using a scanning electron microscope (SEM) as shown in FIG. 3.

Here, half of a total thickness of the ceramic body 110 was defined as A, a thickness of the lower cover layer 113 was Further, samples 14, 15, and 35 to 37 were Comparative Examples of a capacitor having a structure in which the thickness B of the lower cover layer 113 was thicker than the thickness D of the upper cover layer 112, and samples 16 to 34 were Inventive Examples of the capacitor according to the embodiment of the present invention.

Here, in the case in which (B+C)/A was almost 1, it means that the center of the active layer 115 did not largely deviate from the center of the ceramic body 110. In samples 1 to 3 having the cover symmetry structure in which the thickness B of the lower cover layer 113 and the thickness D of the upper cover layer 112 were almost the same as each other, (B+C)/A was almost 1.

When (B+C)/A was larger than 1, it means that the center of the active layer 115 deviated upwardly from the center of the ceramic body 110, and when (B+C)/A was smaller than 1, it means that the center of the active layer 115 deviated downwardly from the center of the ceramic body 110.

Referring to Table 1, it could be appreciated that in samples 16 to 34, in which the ratio of deviation between the center of the active layer 115 and the center of the ceramic body 110, that is, (B+C)/A was in a range of 1.063 to 1.745 (1.063≤(B+C)/A≤1.745), the acoustic noise was significantly reduced to be less than 20 dB.

In addition, samples 1 to 15 in which the ratio of deviation between the center of the active layer 115 and the center of the ceramic body 110, that is, (B+C)/A was less than 1.063, had a structure in which the center of the active layer 115 almost did not deviate from the center of the ceramic body 110 or the center of the active layer 115 deviated downwardly from the center of the ceramic body 110.

In samples 1 to 15 in which (B+C)/A is less than 1.063, the acoustic noise was 23.1 to 32.5 dB. Therefore, it could be appreciated that there is no effect of reducing the acoustic noise in these samples, as compared to Inventive Examples.

In addition, in the samples 35 to 37 in which the ratio of deviation between the center of the active layer 115 and the center of the ceramic body 110, that is, (B+C)/A was more than 1.745, a ratio of capacitance to desired capacitance was low, such that a capacitance defect was generated.

In the Table 1, in the case in which the implementation of capacitance (that is, the ratio of capacitance to desired capacitance) was indicated as "NG," it means that the ratio of capacitance to desired capacitance was less than 80%.

Further, it could be appreciated that in Examples in which the ratio (D/B) of the thickness D of the upper cover layer 112 to the thickness B of the lower cover layer 113 was in a range of 0.021 to 0.422 (0.021≤D/B≤0.422), the acoustic noise was significantly reduced.

On the other hand, it could be appreciated that in Comparative Examples in which the ratio (D/B) of the thickness D of the upper cover layer 112 to the thickness B of the lower cover layer 113 was more than 0.422, the acoustic noise was not reduced.

In the case in which the ratio (D/B) of the thickness D of the upper cover layer 112 to the thickness B of the lower cover layer 113 was less than 0.021, the thickness B of the lower cover layer 113 was excessively thick as compared to the thickness D of the upper cover layer 112, such that cracks or delamination may be generated. In addition, due to the low capacitance as compared to the desired capacitance, the capacitance defect may be generated.

It could be appreciated that the acoustic noise was further reduced to be less than 18 dB in samples 19 to 34, in which the ratio (B/A) of the thickness B of the lower cover layer 113 to the thickness A of the ceramic body 110 and the ratio (C/B) of the thickness C of the active layer 115 to the thickness B of the lower cover layer 113 were in a range of 0.329 to 1.522 and in a range of 0.146 to 2.458, respectively (0.329≤B/A≤1.522 and 0.146≤C/B≤2.458).

On the other hand, in samples 35 to 37 in which the ratio (B/A) of the thickness B of the lower cover layer 113 to the thickness A of the ceramic body 110 was more than 1.522, or the ratio (C/B) of the thickness C of the active layer 115 to the thickness B of the lower cover layer 113 was less than 0.146, the capacitance thereof was excessively low as compared to the desired capacitance, such that the capacitance defect may be generated.

The following Table 2 shows results obtained by comparing a delamination generation rate, a crack generation rate, capacitance, and breakdown voltage (BDV) of multilayered ceramic capacitor samples according to an average thickness td of the dielectric layer 111, an average thickness to of the first and second internal electrodes 121 and 122, and an average grain diameter Da of the dielectric grains.

TABLE 2

| Sample | Average Thickness of Dielectric Layer (μm) | Average Thickness of Internal Electrode (μm) | Average Grain Diameter of Dielectric Grain (μm) | Delamination Generation Rate (%) | Crack Generation Rate (%) | Capacitance (μF) | BDV (V) |
|---|---|---|---|---|---|---|---|
| 1* | 1.8 | 1.5 | 0.3 | 3.5 | 6.0 | 7.85 | 116 |
| 2 | 1.8 | 1.3 | 0.3 | 0.0 | 0.0 | 7.83 | 127 |
| 3 | 1.8 | 1.1 | 0.3 | 0.0 | 0.0 | 7.78 | 136 |
| 4 | 1.8 | 0.8 | 0.3 | 0.0 | 0.0 | 7.65 | 125 |
| 5 | 1.8 | 0.4 | 0.3 | 0.0 | 0.0 | 7.41 | 132 |
| 6* | 1.8 | 0.2 | 0.3 | 0.0 | 0.0 | 5.21 | 138 |
| 7* | 1.8 | 0.1 | 0.3 | 0.0 | 0.0 | 4.16 | 128 |
| 8* | 1.3 | 1.5 | 0.3 | 6.0 | 11.0 | 11.06 | 85 |
| 9* | 1.3 | 1.3 | 0.3 | 1.0 | 5.5 | 11.12 | 92 |
| 10 | 1.3 | 1.1 | 0.3 | 0.0 | 0.0 | 10.85 | 96 |
| 11 | 1.3 | 0.9 | 0.3 | 0.0 | 0.0 | 10.53 | 101 |
| 12 | 1.3 | 0.4 | 0.3 | 0.0 | 0.0 | 9.85 | 89 |
| 13* | 1.3 | 0.2 | 0.3 | 0.0 | 0.0 | 6.97 | 91 |
| 14* | 1.3 | 0.1 | 0.3 | 0.0 | 0.0 | 5.45 | 90 |
| 15* | 0.7 | 1.1 | 0.3 | 3.5 | 5.5 | 21.06 | 31 |
| 16* | 0.7 | 0.9 | 0.3 | 1.0 | 1.5 | 20.85 | 38 |
| 17* | 0.7 | 0.8 | 0.3 | 0.0 | 0.0 | 20.42 | 42 |
| 18* | 0.7 | 0.6 | 0.3 | 0.0 | 0.0 | 20.15 | 37 |
| 19* | 0.7 | 0.4 | 0.3 | 0.0 | 0.0 | 19.85 | 36 |
| 20* | 0.7 | 0.2 | 0.3 | 0.0 | 0.0 | 15.12 | 34 |
| 21* | 0.7 | 0.1 | 0.3 | 0.0 | 0.0 | 12.74 | 32 |
| 22* | 1.8 | 1.5 | 0.7 | 7.5 | 11.5 | 8.98 | 46 |
| 23* | 1.8 | 0.8 | 0.7 | 0.0 | 0.0 | 8.67 | 49 |
| 24* | 1.8 | 1.5 | 0.5 | 5.0 | 7.5 | 8.32 | 98 |

TABLE 2-continued

| Sample | Average Thickness of Dielectric Layer (μm) | Average Thickness of Internal Electrode (μm) | Average Grain Diameter of Dielectric Grain (μm) | Delamination Generation Rate (%) | Crack Generation Rate (%) | Capacitance (μF) | BDV (V) |
|---|---|---|---|---|---|---|---|
| 25 | 1.8 | 0.8 | 0.5 | 0.0 | 0.0 | 8.18 | 110 |
| 26* | 1.8 | 1.5 | 0.3 | 3.5 | 6.0 | 7.85 | 116 |
| 27 | 1.8 | 0.8 | 0.3 | 0.0 | 0.0 | 7.65 | 125 |
| 28* | 1.3 | 1.3 | 0.5 | 2.5 | 6.0 | 11.89 | 33 |
| 29* | 1.3 | 0.9 | 0.5 | 0.0 | 0.0 | 11.52 | 41 |
| 30* | 1.3 | 1.3 | 0.3 | 1.0 | 5.5 | 11.12 | 92 |
| 31 | 1.3 | 0.9 | 0.3 | 0.0 | 0.0 | 10.53 | 101 |
| 32* | 1.3 | 1.3 | 0.2 | 0.5 | 2.0 | 10.28 | 132 |
| 33* | 1.3 | 0.9 | 0.2 | 0.0 | 0.0 | 10.09 | 123 |
| 34* | 0.7 | 0.9 | 0.3 | 1.0 | 1.5 | 20.85 | 38 |
| 35* | 0.7 | 0.6 | 0.3 | 0.0 | 0.0 | 20.15 | 37 |
| 36* | 0.7 | 0.9 | 0.2 | 0.5 | 0.5 | 19.54 | 63 |
| 37 | 0.7 | 0.6 | 0.2 | 0.0 | 0.0 | 19.22 | 71 |

*Comparative Example

Referring to Table 2, it could be appreciated that in samples 1, 8, 9, 15, 16, 22, 24, 26, 28, 30, 32, 34, and 36, which were out of the numerical ranges of the present invention, the delamination and crack generation rates were high, such that reliability may be problematic.

In addition, it could be appreciated that in samples 6, 7, 13, 14, 20, and 21, which were out of the numerical ranges of the present invention, the capacitance was low.

In addition, it could be appreciated that in samples 17 to 19, 23, 29, 33 and 35, which were out of the numerical ranges of the present invention, the breakdown voltage (BDV) was low.

Meanwhile, it could be appreciated that in samples 2 to 5, 10 to 12, 25, 27, 31, and 37, which were in the numerical ranges of the present invention, the delamination and crack generation rates may be low, such that reliability may be excellent and the breakdown voltage (BDV) maybe high, whereby a high capacitance multilayered ceramic capacitor may be implemented.

Board for Mounting Multilayered Ceramic Capacitor

Figure 5:
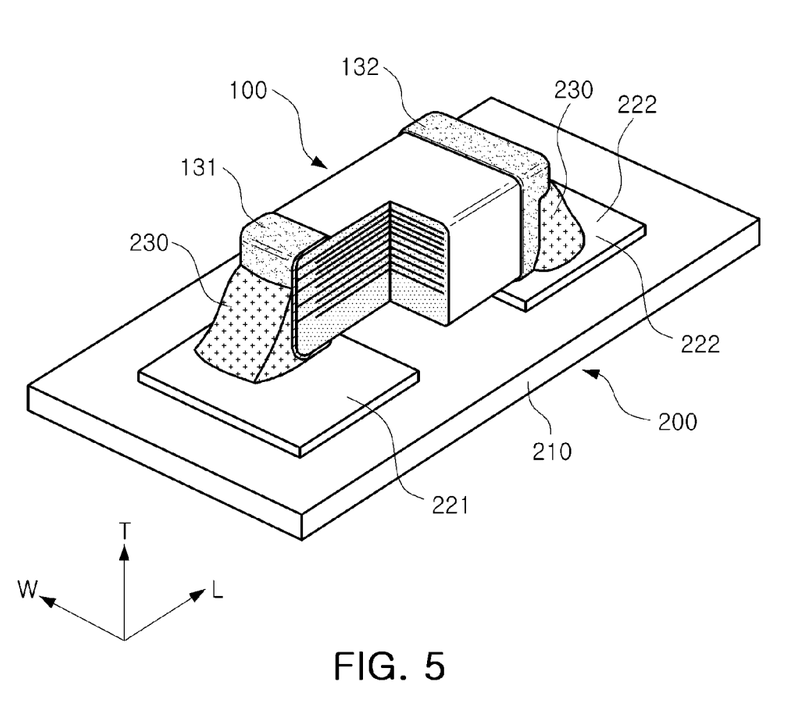
FIG. 5 is a perspective view showing a form in which the multilayered ceramic capacitor of FIG. 1 is mounted on a printed circuit board.
Figure 6:
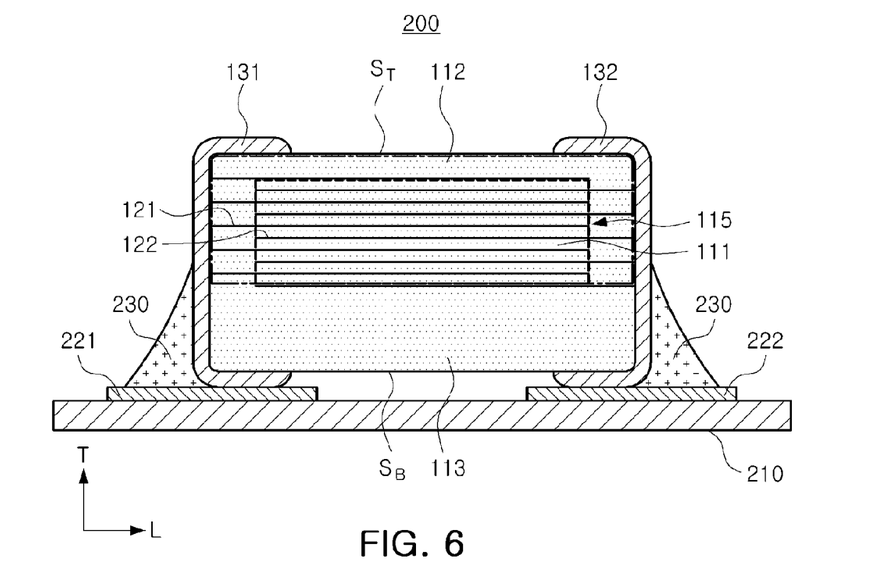
FIG. 6 is a cross-sectional view of the multilayered ceramic capacitor and the printed circuit board of FIG. 4 taken in the length direction.

Referring to FIGS. 5 and 6, a board 200 for mounting a multilayered ceramic capacitor 100 according to the embodiment of the present invention may include a printed circuit board 210 on which the multilayered ceramic capacitor 100 is horizontally mounted and first and second electrode pads 221 and 222 formed on the printed circuit board 210 to be spaced apart from each other.

In this case, the multilayered ceramic capacitor 100 may be electrically connected to the printed circuit board 210 by soldering 230 in a state in which a lower cover layer 113 is disposed to be a lower portion of the capacitor and first and second external electrodes 131 and 132 are positioned on the first and second electrode pads 221 and 222 to contact the first and second electrode pads 221 and 222, respectively.

When voltage is applied in a state in which the multilayered ceramic capacitor 100 is mounted on the printed circuit board 210 as described above, acoustic noise may be generated.

Here, sizes of the first and second electrode pads 221 and 222 may become an indicator for determining an amount of the solder 230 connecting the first and second external electrodes 131 and 132 of the multilayered ceramic capacitor 100 to the first and second electrode pads 221 and 222, and a level of the acoustic noise may be adjusted according to the amount of the solder 230.

Figure 7:
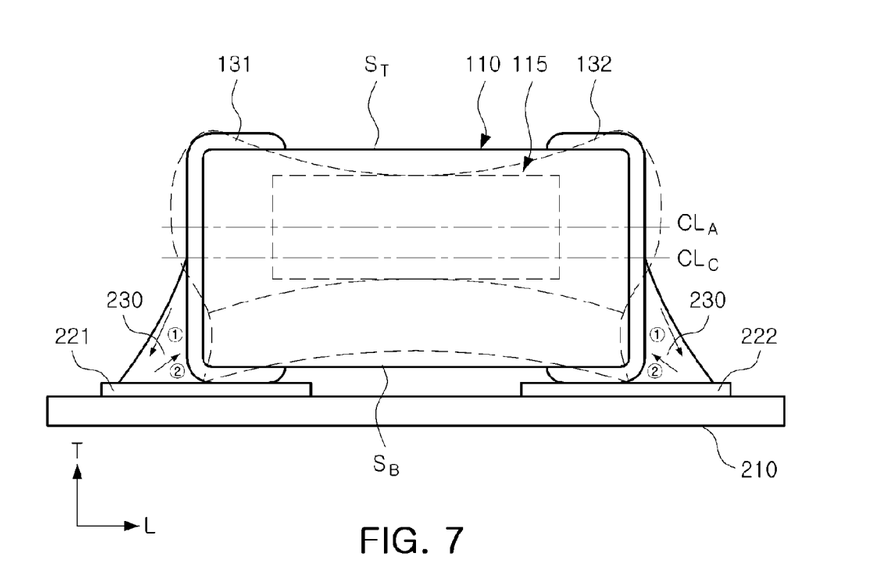
FIG. 7 is a cross-sectional view schematically showing that the multilayered ceramic capacitor of FIG. 4 is deformed when voltage is applied thereto in a state in which the multilayered ceramic capacitor is mounted on the printed circuit board.

Referring to FIG. 7, when voltages having different polarities are applied to the first and second external electrodes 131 and 132 formed on both end portions of the multilayered ceramic capacitor 100 in a state in which the multilayered ceramic capacitor 100 is mounted on the printed circuit board 210, the ceramic body 110 may be expanded and contracted in the thickness direction by the inverse piezoelectric effect of the dielectric layer 111, and both end portions of the first and second external electrodes 131 and 132 may be expanded and contracted as opposed to the expansion and contraction of the ceramic body 110 in the thickness direction by the poisson effect.

Here, the center of the active layer 115 is significantly expanded and contracted at both end portions of the first and second external electrodes 131 and 132 in the length direction, which may be a cause of the acoustic noise generation.

When both end surfaces of the multilayered ceramic capacitor 100 in the length direction are maximally expanded, outward expansive force is generated in an upper portion of the solder 230 by expansion, and force is generated in a lower portion of the solder 230 to act on the external electrodes due to the outward expansive force created by the expansion.

Therefore, in the case in which points of inflection (PI) formed on both end surfaces of the ceramic body 110 due to a difference between strain generated in the center $CL_A$ of the active layer 115 and strain generated in the lower cover layer 113 are formed in positions lower than a height of the solder 230 as in the present embodiment, the acoustic noise may be further reduced.

As set forth above, according to embodiments of the present invention, vibrations generated in a multilayered ceramic capacitor may be reduced to thereby reduce acoustic noise at the time of mounting the multilayered ceramic capacitor on a printed circuit board, improve assembly characteristics of the mounting board, and reduce a defect generation rate of the mounting board.

In addition, according to embodiments of the present invention, a multilayered ceramic capacitor having excellent reliability may be implemented by adjusting an average thickness of internal electrodes in the multilayered ceramic capacitor.

Further, breakdown voltage (BDV) characteristics may be improved by adjusting an average grain diameter of dielectric grains in a dielectric layer.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic capacitor comprising:
a ceramic body in which a plurality of dielectric layers having an average thickness of 0.2 to 2.0 μm are stacked;
an active layer including a plurality of first and second internal electrodes formed to be alternately exposed to both end surfaces of the ceramic body, having the dielectric layer interposed therebetween, to form capacitance;
an upper cover layer formed above the active layer;
a lower cover layer formed below the active layer and being thicker than the upper cover layer; and
first and second external electrodes formed to cover the both end surfaces of the ceramic body,
wherein the dielectric layer is configured of dielectric grains,
when an average thickness of the dielectric layer is defined as td (μm), an average thickness of the first and second internal electrodes is defined as te (μm), and an average grain size of the dielectric grains is defined as Da (μm), Da≤td/3 and 0.2 μm<te<(td)$^{1/2}$ are satisfied, and
wherein when half of a total thickness of the ceramic body is defined as A, a thickness of the lower cover layer is defined as B, half of a total thickness of the active layer is defined as C, and a thickness of the upper cover layer is defined as D, a ratio ((B+C)/A) of deviation between a center of the active layer and a center of the ceramic body is within a range of 1.063 to 1.745 (1.063≤(B+C)/A≤1.745).

2. The multilayered ceramic capacitor of claim 1, wherein when a thickness of the lower cover layer is defined as B and a thickness of the upper cover layer is defined as D, a ratio (D/B) of the thickness D of the upper cover layer to the thickness B of the lower cover layer is in a range of 0.021 to 0.422 (0.021≤D/B≤0.422).

3. The multilayered ceramic capacitor of claim 1, wherein when half of a total thickness of the ceramic body is defined as A and a thickness of the lower cover layer is defined as B, a ratio (B/A) of the thickness B of the lower cover layer to the half A of the thickness of the ceramic body is in a range of 0.329 to 1.522 (0.329≤B/A≤1.522).

4. The multilayered ceramic capacitor of claim 1, wherein when a thickness of the lower cover layer is defined as B and half of a total thickness of the active layer is defined as C, a ratio (C/B) of the half C of the thickness of the active layer to the thickness B of the lower cover layer is in a range of 0.146 to 2.458 (0.146≤C/B≤2.458).

5. The multilayered ceramic capacitor of claim 1, wherein points of inflection (PI) formed in both end surfaces of the ceramic body are formed in positions lower than a center of the ceramic body in a thickness direction due to a difference between strain generated in a center of the active layer and strain generated in the lower cover layer when voltage is applied thereto.

6. The multilayered ceramic capacitor of claim 1, wherein the number of stacked dielectric layers is 150 or more.

7. A board for mounting a multilayered ceramic capacitor, the board comprising:
a printed circuit board having first and second electrode pads formed thereon; and
a multilayered ceramic capacitor mounted on the printed circuit board,
wherein the multilayered ceramic capacitor includes:
a ceramic body in which a plurality of dielectric layers having an average thickness of 0.2 to 2.0 μm are stacked;
an active layer including a plurality of first and second internal electrodes formed to be alternately exposed to both end surfaces of the ceramic body, having the dielectric layer interposed therebetween, to form capacitance;
an upper cover layer formed above the active layer;
a lower cover layer formed below the active layer and being thicker than the upper cover layer; and
first and second external electrodes formed on the both end surfaces of the ceramic body and connected to the first and second electrode pads by soldering,
the dielectric layer being configured of dielectric grains,
when an average thickness of the dielectric layer is defined as td (μm), an average thickness of the first and second internal electrodes is defined as te (μm), and an average grain size of the dielectric grains is defined as Da (μm), Da≤td/3 and 0.2 μm<te<(td)$^{1/2}$ are satisfied, and
wherein when half of a total thickness of the ceramic body is defined as A, a thickness of the lower cover layer is defined as B, half of a total thickness of the active layer is defined as C, and a thickness of the upper cover layer is defined as D, a ratio ((B+C)/A) of deviation between a center of the active layer and a center of the ceramic body is within a range of 1.063 to 1.745 (1.063≤(B+C)/A≤1.745).

8. The board of claim 7, wherein when a thickness of the lower cover layer is defined as B and a thickness of the upper cover layer is defined as D, a ratio (D/B) of the thickness D of the upper cover layer to the thickness B of the lower cover layer is in a range of 0.021 to 0.422 (0.021≤D/B≤0.422).

9. The board of claim 7, wherein half of a total thickness of the ceramic body is defined as A and a thickness of the lower cover layer is defined as B, a ratio (B/A) of the thickness B of the lower cover layer to the half A of the thickness of the ceramic body is in a range of 0.329 to 1.522 (0.329≤B/A≤1.522).

10. The board of claim 7, wherein when a thickness of the lower cover layer is defined as B and half of a total thickness of the active layer is defined as C, a ratio (C/B) of the half C of the thickness of the active layer to the thickness B of the lower cover layer is in a range of 0.146 to 2.458 (0.146≤C/B≤2.458).

11. The board of claim 7, wherein points of inflection (PI) formed in both end surfaces of the ceramic body are formed in positions lower than a height of the soldering due to a difference between strain generated in a center of the active layer and strain generated in the lower cover layer when voltage is applied thereto.

12. The board of claim 7, wherein the number of stacked dielectric layers is 150 or more.

* * * * *